(12) United States Patent
Aslot et al.

(10) Patent No.: US 7,506,343 B2
(45) Date of Patent: Mar. 17, 2009

(54) SYSTEM AND METHOD FOR PASSING INFORMATION FROM ONE DEVICE DRIVER TO ANOTHER

(75) Inventors: Vishal Chittranjan Aslot, Austin, TX (US); Bruce G. Mealey, Austin, TX (US); James Anthony Pafumi, Leander, TX (US); James Britt Partridge, Bastrop, TX (US); Chris Alan Schwendiman, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 740 days.

(21) Appl. No.: 10/922,276

(22) Filed: Aug. 19, 2004

(65) Prior Publication Data
US 2006/0136612 A1    Jun. 22, 2006

(51) Int. Cl.
*G06F 9/44* (2006.01)
(52) U.S. Cl. .................... 719/324; 719/327; 710/22
(58) Field of Classification Search ......... 719/324–327, 719/310; 710/22; 711/200, 202, 206
See application file for complete search history.

(56) References Cited

U.S. PATENT DOCUMENTS

| | | | | |
|---|---|---|---|---|
| 5,337,412 A | * | 8/1994 | Baker et al. | 719/324 |
| 6,473,803 B1 | * | 10/2002 | Stern et al. | 709/238 |
| 6,725,284 B2 | * | 4/2004 | Arndt | 710/5 |
| 7,096,473 B2 | * | 8/2006 | Ruget et al. | 719/321 |
| 7,124,228 B2 | * | 10/2006 | Grouzdev | 710/306 |
| 2002/0010811 A1 | * | 1/2002 | Arndt et al. | 710/5 |
| 2002/0129085 A1 | * | 9/2002 | Kubala et al. | 709/104 |

OTHER PUBLICATIONS

"Writing Device Drivers." Santa Clara, CA: Sun Microsystems, Inc., May 2002.*
"Writing Solaris PCI Device Drivers for Sun SPARC Platforms". Sun Microsystems, Inc., Feb. 1997. http://developers.sun.com/solaris/developer/support/driver/wps/pci/html/PCIDDTOC.doc.html.*
Rajeev, S., "Peripheral Component Interconnect", PCI Architecture, http://clicker.sourceforge.net/docs/teacup/pcidoc/PCI-hardware-overview-draft.html, pp. 1-12.

* cited by examiner

*Primary Examiner*—Van H Nguyen
(74) *Attorney, Agent, or Firm*—Yee & Associates, P.C.; Diana L. Roberts-Gerhardt (57) ABSTRACT

A system and method for passing data between a first device driver and a second device driver. Data to be provided to the second device driver is identified in the first device driver. A data exchange interface within a kernel space is invoked by the first device driver. The data exchange interface initializes a physical to Direct Memory Access (DMA) address translation table for the child device based on an identifier of a direct memory access window. The data is provided to the data exchange interface. The data exchange interface, in the kernel space, writes the data to a data structure maintained and used by the second device driver.

13 Claims, 9 Drawing Sheets

/pci@800000020000001/pci@2,2   <<<<This is a node for the bus generated by a
PCI-to-PCI bridge (not all properties are shown)

name
    70636900                                     [pci............]

device_type
    70636900                                       [pci............]

reg
    00001000 00000000 00000000 00000000    [...............]
    00000000                                       [...............]

address-cells
    00000003                                       [...............]

size-cells
    00000002                                       [...............]

compatible
    70636931 3031342c 31383800 70636963    [pci1014,188.pcic]
    6c617373 2c303630 3430660           [lass,06040f.....]

vendor-id
    00001014                                     [...............]

device-id
    00000188                                       [...............]

revision-id
    00000002                                       [...............]

class-code
    0006040f                                       [...............]

devsel-speed
    00000002                                       [...............]

66mhz-capable
cache-line-size
    00000020                                       [...............]

bus-range
    00000040 00000043                       [....@...c......]

ranges
    81000000 00000000 000f0000 81000000    [...............]
    00000000 000f0000 00000000 00010000    [...............]
    82000000 00000000 d0000000 82000000    [...............]
    00000000 d0000000 00000000 10000000    [...............]

interrupt-cells
    00000001                                       [...............]

interrupt-map-mask
    00000800 00000000 00000000 00000007    [...............]

interrupt-map
    00000800 00000000 00000000 00000001    [...............]
    25000001 00000053 00000001            [%....s.........]

dma-window
    00000001 02000000 10000000            [...............]

*FIG. 3A*

/pci@800000020000001/pci@2,2/usb@1    <<<< Integrated USB, Port #1, that is on the above PCI bus ibm,loc-code
    55373837 392e3030 312e3033 39353535    [U7879.001.039555]
    382d5031 00    [8-P1............]
vendor-id
    00001033    [...3............]
device-id
    00000035    [...5............]
revision-id
    00000043    [...C............]
class-code
    000c0310    [................]
interrupts
    00000001    [................]
min-grant
    00000001    [................]
max-latency
    0000002a    [...*............]
subsystem-vendor-id
    00001033    [...3............]
subsystem-id
    00000035    [...5............]
devsel-speed
    00000001    [................]
built-in
name
    75736200    [usb.............]
compatible
    70636931 3033332c 33350070 63693130    [pci1033,35.pci10..]
    33332c33 35007063 69636c61 73732c30    [33,35.pciclass,0...]
    63303331 3000    [c0310...........]
reg
    00480800 00000000 00000000 00000000    [.H..............]
    00000000 02480810 00000000 00000000    [.....H..........]
    00000000 00001000    [................]
address-cells
    00000001    [................]
size-cells
    00000000    [................]
assigned-addresses
    82480810 00000000 c0001000 00000000    [.H..............]
    00001000    [................]

*FIG. 3B*

/pci@800000020000001/pci@2,2/usb@1,1    <<<< Integrated USB, Port #2, that is on the above PCI bus ibm,loc-code
    55373837 392e3030 312e3033 39353535        [U7879.001.039555]
    382d5031 00                                [8-P1............]
vendor-id
    00001033                                   [...3............]
device-id
    00000035                                   [...5............]
revision-id
    00000043                                   [...C............]
class-code
    000c0310                                   [................]
interrupts
    00000002                                   [................]
min-grant
    00000001                                   [................]
max-latency
    0000002a                                   [...*............]
subsystem-vendor-id
    00001033                                   [...3............]
subsystem-id
    00000035                                   [...5............]
devsel-speed
    00000001                                   [................]
built-in
name
    75736200                                   [usb.............]
compatible
    70636931 3033332c 33350070 63693130        [pci1033,35.pci10..]
    33332c33 35007063 69636c61 73732c30        [33,35.pciclass,0...]
    63303331 3000                              [c0310............]
reg
    00480900 00000000 00000000 00000000        [.H..............]
    00000000 02480910 00000000 00000000        [.....H..........]
    00000000 00001000                           [................]
address-cells
    00000001                                   [................]
size-cells
    00000000                                   [................]
assigned-addresses
    82480910 00000000 c0000000 00000000        [.H..............]
    00001000                                   [................]

*FIG. 3C*

/vdevice << node for the virtual (VIO) bus. Note that it does not have a "dma-window" property.
  name
        76646576 69636500                       [vdevice..........]
  device_type
        76646576 69636500                       [vdevice..........]
  compatible
        49424d2c 76646576 69636500           [IBM, vdevice......]
  #address-cells
        00000001                                [.................]
  #size-cells
        00000000                                [.................]
  #interrupt-cells
        00000002                                [.................]
  interrupt-ranges
        000a0000 00000009                       [.................]
  interrupt-controller /vdevice/v-scsi-host@30000002 << A virtual device, in this case a virtual SCSI target device.

name
        762d7363 73692d68 6f737400           [v-scsi-host........]
  device_type
        762d7363 73692d68 6f737400           [v-scsi-host........]
  compatible
        49424d2c 762d7363 73692d68 6f737400  [IBM, v-scsi-host...]
  ibm, loc-code
        55393131 372e3537 302e3131 30303432  [U9117.570.110042]
        412d5631 2d433200                     [A-V1-C2..........]
  reg
        30000002                                [0................]
  interrupts
        000a002 00000000                      [.................]
  ibm, #dma-address-cells
        00000002                                [.................]
  ibm, #dma-size-cells
        00000002                                [.................]
  dma-window << In this example, there are two triples of logical bus identifier, starting address, and size of the window
        19000002 00000000 00000000 00000000  [.................]
        10000000 13000002 00000000 00000000  [.................]
        00000000 10000000                     [.................]
  ibm, vserver

SYSTEM AND METHOD FOR PASSING INFORMATION FROM ONE DEVICE DRIVER TO ANOTHER

BACKGROUND OF THE INVENTION

1. Technical Field

The present invention is generally directed to an improved data processing system in which information may be passed directly from one device driver to another. More specifically, the present invention is directed to a system and method for passing Direct Memory Access (DMA) configuration information from one device driver to another in order to initialize devices for DMA operations.

2. Description of Related Art

In the Peripheral Component Interconnect (PCI) system architecture, a PCI bus has several child devices coupled to the PCI bus. Direct Memory Access (DMA) operations are one of the mechanisms used by such child devices to transfer data to and from system memory via the PCI bus. The PCI bus has an allocated portion of system memory that may be used to perform DMA operations, i.e. a DMAble address space or memory region. In order to perform such DMA operations, each child device is assigned a certain range of addresses within this DMAble address space. A child device is configured to perform DMA operations within its allocated portion of the PCI bus' DMAble address space.

The DMAble memory region is described using three parameters: a starting address that identifies where the DMAble memory region begins, a size that designates how large the DMAble memory region is, and a unique identifier related to the DMAble region. Since the entire DMAble memory region belongs to the PCI bus and then portions of this DMAble memory region are carved out for each of the child devices, the information regarding the DMAble memory region is maintained at the PCI bus node level in an Open Firmware Device Tree.

Open Firmware provides the ability to generate hardware independent boot code, firmware and device drivers for computer systems. The basic tasks of boot code are 1) build a device tree, which the operating system then uses to discover what devices are available to it and how to use them, and 2) boot device drivers. The particular format of the device tree is operating system dependent, but all device trees have a great deal in common. That commonality can be expressed in a common language independent of the operating system. The format of an Open Firmware Device Tree is such a common language.

In a typical installation, the operating system uses client interface calls to translate the Open Firmware Device Tree into the operating system's own format. The Open Firmware Device Tree is a generic and simple format for a device tree. It can be used to represent the various entries in a device tree for just about any operating system. Like any tree, it consists of nodes, some of which are leaf nodes, i.e. nodes that have no children. Every node has one parent, except for the top node. Each node has a node name, and a list of "properties" and "methods". In fact, the node name is a property, one that is required for every node. The properties are named data. Open firmware makes no restrictions on how the operating system will eventually use this named data, except for reserving certain names to have certain meanings: the "name" property, for example, is always the node name. This named data may also be of any type: string and integer types are specifically supported, while compound types may be grouped together out of combinations of "int," "string" and "bytes", the latter being for any length of arbitrary consecutive bytes.

As mentioned above, with such an Open Firmware Device Tree, the information about the DMAble memory region or address space is part of the PCI bus node in the Open Firmware Device Tree. During configuration of the system and its devices, this DMA memory region information is passed to the PCI bus driver, during configuring of the PCI bus and its child devices, so that the PCI bus driver carves out portions of this DMAble memory region for each child device as the devices register for DMA operations with the PCI bus driver. Thus, it is entirely up to the PCI bus driver's discretion as to which portion of the DMAble memory region is assigned to each child device. In other words, the PCI bus driver does not need any additional information from the child devices in order to apportion portions of the DMAble memory region to child devices.

With virtual input/output (I/O) buses and devices, a different situation is introduced. With virtual I/O (VIO), there is one DMAble address space per device. These DMAble address spaces are not part of a larger address space, such as the DMAble address space allocated to the PCI bus described above. In other words, the DMAble address space allocated to each device is not carved out of a larger DMAble address space that the VIO bus owns but instead, is a DMAble address space owned by the device in its entirety. As a result, the three pieces of information described above, i.e. the starting address, size and identifier of the virtual address space, is present within the device nodes of the Open Firmware Device Tree.

The device configuration happens in a similar manner as discussed above with regard to the PCI bus. That is, the same hierarchical order where the bus is configured before its children is used to perform the device configuration. The problem, however, is that now the VIO bus does not know about the DMAble address space assigned to the devices and thus, DMA operations cannot commence. Therefore, it would be desirable to have a mechanism for informing the VIO bus of the DMAble address space allocated to a device coupled to the VIO bus so that DMA operations may be performed via the VIO bus to system memory.

SUMMARY OF THE INVENTION

The present invention provides a system and method for passing information directly from one device driver to another device driver in the kernel space. With regard to one exemplary embodiment of the present invention, a mechanism is provided for passing Direct Memory Access (DMA) configuration information from one device driver to another in order to initialize devices for DMA operations. More specifically, this embodiment of the present invention provides a mechanism for passing information identifying a DMA virtual address space allocated to a child device from the child device to the virtual I/O (VIO) bus so that DMA operations may be initialized for the child device via the VIO bus.

With the system and method of the present invention, the device driver of the child device passes information regarding the DMAble address space of the child device directly to the device driver of the VIO bus using one of a I/O control (IOCTL) interface and an operating system kernel service. The device drivers are loaded in the kernel space. Thus, information regarding the DMAble address space is passed between device drivers in kernel space rather than user space.

In one exemplary embodiment of the present invention, all of the VIO bus and child device information is stored in a device tree, such as an Open Firmware Device Tree, that is generated at boot time, such as by the Open Firmware. A configuration manager runs at boot time and reads the information from the device tree and, as it parses the device tree, calls appropriate configuration methods for the various devices (e.g., there is one configuration method per device).

In the case of a VIO bus and its child devices, the configuration manager calls the configuration method for the VIO bus followed by the configuration methods of its child devices. Since the VIO bus node in the device tree does not contain any information about the DMAble address space, the configuration method for the VIO bus does not pass any DMAble address space information to the VIO bus device driver. Thereafter, as the child devices are configured, the information for each child device's DMAble address space is made available from its node in the device tree and is in turn passed down to that child device's device driver.

The present invention provides mechanisms for passing this DMAble address space from the child device's device driver directly to the device driver for the VIO bus. In one exemplary embodiment of the present invention, this mechanism is implemented as one or more input/output control (IOCTL) methods that are part of the VIO bus device driver and which may be called by the device drivers for the child devices. These IOCTL methods permit the child device's device driver to call the IOCTL method with a parameter identifying the DMA address space for the child device which is then written to data structures maintained by the VIO bus' device driver for use in performing DMA operations with that child device. These IOCTL methods may take the form of a pair of IOCTL methods, one for registering child devices with the VIO bus and one for unregistering child devices with the VIO bus, or may be a single register/unregister IOCTL method with a bit indicating whether the method is to perform registration or unregistration operations.

In an alternative embodiment of the present invention, a similar functionality may be provided through the use of new kernel services that permit registration of child devices with the VIO bus device driver. With this alternative embodiment, the child device's device driver may call a kernel service for either registering or unregistering the child device with the VIO bus device driver. The call to this kernel service may include a parameter identifying the DMA address space allocated to that child device. The kernel service may then provide this DMA address space information to the VIO bus device driver which writes this information to a data structure maintained by the VIO bus device driver for use in performing DMA operations with that child device.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

The present invention provides a mechanism for passing information directly between device drivers within kernel space. In one exemplary embodiment, the mechanisms of the present invention permit configuration information for devices to be passed directly between device drivers during configuration of a system. The exemplary embodiments of the present invention will be described in terms of configuring devices for direct memory access (DMA) operations and passing of DMA information between device drivers, however the present invention is not limited to exchange of only this type of information. Rather, any type of information that may be desirable to pass directly between device drivers in kernel space may be exchanged using the mechanisms of the present invention. For example, other types of information that may be passed between device drivers may include interrupt related information, memory-mapped I/O related information, or any device specific information that requires sharing.

For purposes of the following description, however, it will be assumed that the information being passed between the device drivers is DMA configuration information for configuring DMA hardware and operating system resources for DMA operations with child devices of a bus. Under this assumption, the present invention provides mechanisms that facilitate device drivers of child devices to send DMAble address space information from these device drivers to the device driver of a virtual I/O (VIO) bus device driver directly in kernel space. In this way, the VIO bus device driver is provided with DMA configuration information that may be used to initialize DMA hardware and operating system resources so that DMA operations may be performed by the child devices to system memory via the VIO bus.

Figure 1:
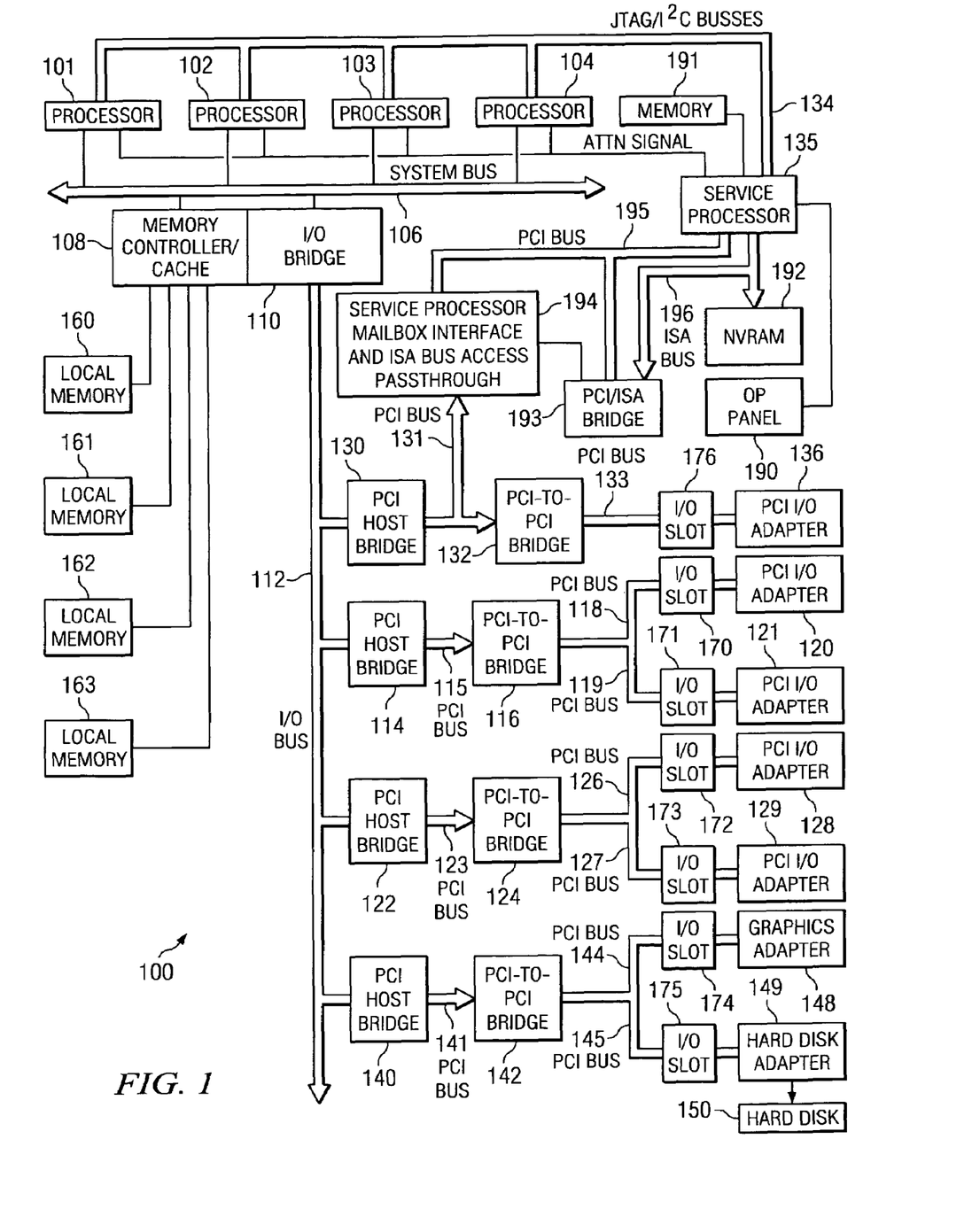
FIG. 1 is a block diagram of a data processing system in which the present invention may be implemented.

With reference now to the figures, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104 connected to system bus 106. For example, data processing system 100 may be an IBM eServer, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160-163. I/O bus bridge 110 is connected to system bus 106 and provides an interface to I/O bus 112. Memory controller/cache 108 and I/O bus bridge 110 may be integrated as depicted.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120-121, 128-129, and 136, graphics adapter 148, and hard disk adapter 149 may be assigned to different logical partitions. In this case, graphics adapter 148 provides a connection for a display device (not shown), while hard disk adapter 149 provides a connection to control hard disk 150.

Thus, for example, suppose data processing system 100 is divided into three logical partitions, P1, P2, and P3. Each of PCI I/O adapters 120-121, 128-129, 136, graphics adapter 148, hard disk adapter 149, each of host processors 101-104, and memory from local memories 160-163 is assigned to each of the three partitions. In these examples, memories 160-163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160-163, and I/O adapters 120, 128, and 129 may be assigned to logical partition P1; processors 102-103, some portion of memory from local memories 160-163, and PCI I/O adapters 121 and 136 may be assigned to partition P2; and processor 104, some portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Linux or OS/400 operating system may be operating within logical partition P3.

Peripheral component interconnect (PCI) host bridge 114 connected to I/O bus 112 provides an interface to PCI local bus 115. A number of PCI input/output adapters 120-121 may be connected to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations will support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI bus 123. PCI bus 123 is connected to a plurality of PCI I/O adapters 128-129. PCI I/O adapters 128-129 may be connected to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. In this manner, data processing system 100 allows connections to multiple network computers.

A memory mapped graphics adapter 148 inserted into I/O slot 174 may be connected to I/O bus 112 through PCI bus 144, PCI-to-PCI bridge 142, PCI bus 141 and PCI host bridge 140. Hard disk adapter 149 may be placed into I/O slot 175, which is connected to PCI bus 145. In turn, this bus is connected to PCI-to-PCI bridge 142, which is connected to PCI host bridge 140 by PCI bus 141.

A PCI host bridge 130 provides an interface for a PCI bus 131 to connect to I/O bus 112. PCI I/O adapter 136 is connected to I/O slot 176, which is connected to PCI-to-PCI bridge 132 by PCI bus 133. PCI-to-PCI bridge 132 is connected to PCI bus 131. This PCI bus also connects PCI host bridge 130 to the service processor mailbox interface and ISA bus access pass-through logic 194 and PCI-to-PCI bridge 132. Service processor mailbox interface and ISA bus access pass-through logic 194 forwards PCI accesses destined to the PCI/ISA bridge 193. NVRAM storage 192 is connected to the ISA bus 196. Service processor 135 is coupled to service processor mailbox interface and ISA bus access pass-through logic 194 through its local PCI bus 195. Service processor 135 is also connected to processors 101-104 via a plurality of JTAG/I$^2$C busses 134. JTAG/I$^2$C busses 134 are a combination of JTAG/scan busses (see IEEE 1149.1) and Phillips I$^2$C busses. However, alternatively, JTAG/I$^2$C busses 134 may be replaced by only Phillips I$^2$C busses or only JTAG/scan busses. All SP-ATTN signals of the host processors 101, 102, 103, and 104 are connected together to an interrupt input signal of the service processor. The service processor 135 has its own local memory 191, and has access to the hardware OP-panel 190.

When data processing system 100 is initially powered up, service processor 135 uses the JTAG/I$^2$C busses 134 to interrogate the system (host) processors 101-104, memory controller/cache 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101-104, memory controller/cache 108, and I/O bridge 110. Any error information for failures detected during the BISTS, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101-104, local memories 160-163, and I/O bridge 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

The present invention provides a system and method for passing Direct Memory Access (DMA) configuration information from one device driver to another in order to initialize devices for DMA operations. More specifically, the present invention provides a mechanism for passing information identifying a DMA address space allocated to a child device from the child device to the virtual I/O (VIO) bus so that DMA operations may be initialized for the child device via the VIO bus.

With the system and method of the present invention, the device driver of the child device passes information regarding the DMAble address space of the child device directly to the device driver of the VIO bus using one of an I/O control (IOCTL) interface and an operating system kernel service. Thus, information regarding the DMAble address space is passed between device drivers in kernel space rather than user space.

In one exemplary embodiment of the present invention, all of the VIO bus and child device information is stored in a device tree, such as an Open Firmware Device Tree, that is generated at boot time, such as by the Open Firmware. A configuration manager runs at boot time and reads the information from the device tree and, as it parses the device tree, calls appropriate configuration methods for the various devices (e.g., there is one configuration method per device). In the case of a VIO bus and its child devices, the configuration manager calls the configuration method for the VIO bus followed by the configuration methods of its child devices. Since the VIO bus node does not contain any information about the DMAble address space, the configuration method for the VIO bus does not pass any DMAble address space information to the VIO bus device driver. Thereafter, as the child devices are configured, the information for each child device's DMAble address space is made available from its node in the device tree and is in turn passed down to that device's device driver.

The present invention provides mechanisms for passing this DMAble address space from the child device's device driver directly to the device driver for the VIO bus. In one exemplary embodiment of the present invention, this mechanism is implemented as one or more input/output control (IOCTL) methods that are part of the VIO bus device driver and which may be called by the device drivers for the child devices. These IOCTL methods permit the child device's device driver to call the IOCTL method with a parameter identifying the DMA address space for the child device which is then written to data structures maintained by the VIO bus' device driver for use in performing DMA operations with that child device. These IOCTL methods may take the form of a pair of IOCTL methods, one for registering child devices with the VIO bus and one for unregistering child devices with the VIO bus, or may be a single register/unregister IOCTL method with a bit indicating whether the method is to perform registration or unregistration operations.

In an alternative embodiment of the present invention, a similar functionality may be provided through the use of new kernel services that permit registration of child devices with the VIO bus device driver. With this alternative embodiment, the child device's device driver may call a kernel service for either registering or unregistering the child device with the VIO bus device driver. The call to this kernel service may include a parameter identifying the DMA address space allocated to that child device. The kernel service may then provide this DMA address space information to the VIO bus device driver which writes this information to a data structure maintained by the VIO bus device driver for use in performing DMA operations with that child device.

Figure 2:
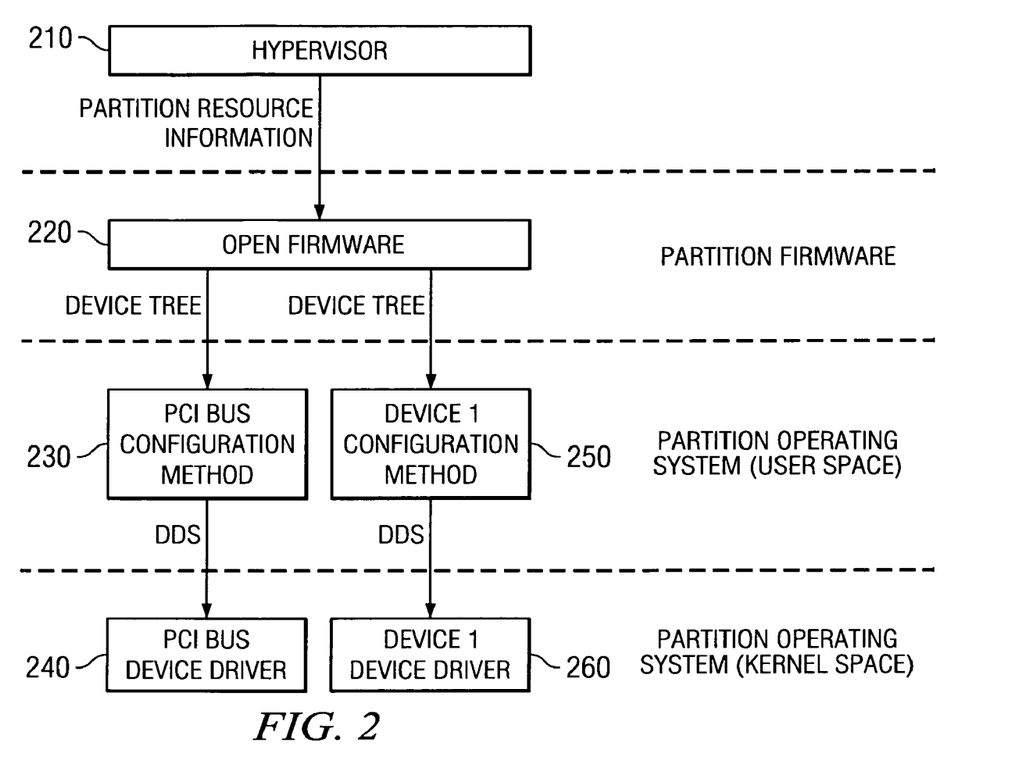
FIG. 2 is an exemplary diagram illustrating a DMA configuration operation for a PCI bus in accordance with a known configuration mechanism.

FIG. 2 is an exemplary diagram illustrating a DMA configuration operation for a PCI bus in accordance with a known configuration mechanism. As shown in FIG. 2, the hypervisor 210, which is firmware for managing partitions in a logically partitioned computing system, provides partition resource information to the open firmware 220 which generates a device tree, such as the Open Firmware Device Tree. The hypervisor 210 stores information regarding the allocation of memory to various devices associated with the partitions of the data processing system. This information identifies the amount of system memory available for DMA operations for a partition. This allocation of DMA useable system memory, i.e. the dma-window, is passed down the device tree to the lowest level PCI bus, i.e. the PCI bus closest to the input/output devices. In addition, the hypervisor 210 determines the allocation of this dma-window to the child devices of the PCI bus.

When the partition is to be configured, a configuration manager in the operating system receives the device tree from the open firmware and traverses the device tree in order to configure the devices for the partition. The operating system calls the appropriate configuration methods for the nodes in the device tree which then perform the necessary kernel service calls to actually configure the devices for use. The configure method moves a device from defined (not available for use in the system) to available (available for use in the system). If the device has a device driver, the configure method loads the device driver into the operating system kernel and describes the device characteristics to the device driver using a device dependent structure (DDS).

Since, in the device tree, the PCI bus node appears before its child device nodes, the PCI bus configuration method 230 is called first by the configuration manager of the operating system to thereby configure the PCI bus. Thereafter, the child devices of the PCI bus are configured by calling their respective configuration methods.

The PCI bus configuration method 230 receives the device tree from the open firmware 220 and generates a device dependent structure (DDS) which is provided to the PCI bus device driver 240. A DDS contains information that describes a device instance to the device driver. It typically contains information about device-dependent attributes as well as other information the device driver needs to communicate with the device. A device's DDS is built each time the device is configured. The configuration method can fill in the DDS with fixed values, computed values, and information from the device tree.

The DDS passed to the PCI bus driver 240 includes information about the dma-window for that PCI bus. The PCI bus device driver 240 then, in accordance with information obtained from the hypervisor 210, apportions the dma-window to the child devices that are to be registered with the PCI bus. Thereafter, when a child device's configuration method 250 is called by the configuration manager, the child device's configuration method 250 may obtain other device specific information (for example, interrupt related information) from the hypervisor 210 and provide this information to the child device's device driver 260 for use in configuring the device (for example, the interrupt information may be used to initialize the interrupt control hardware for the device).

Figure 3A:
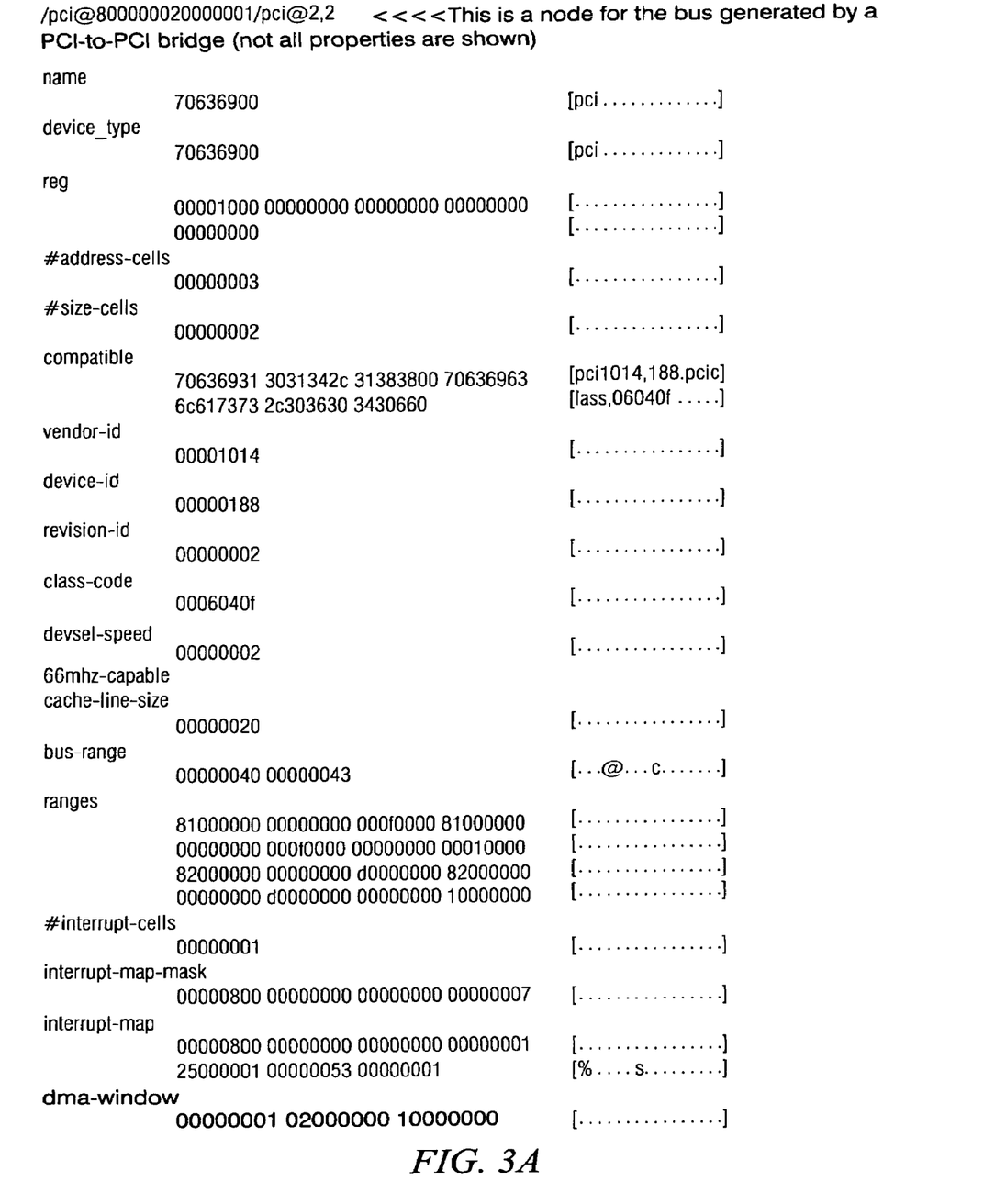
FIGS. 3A-3C are exemplary diagrams of a portion of a device tree for a PCI bus and its child devices in accordance with a known configuration mechanism.
Figure 3B:
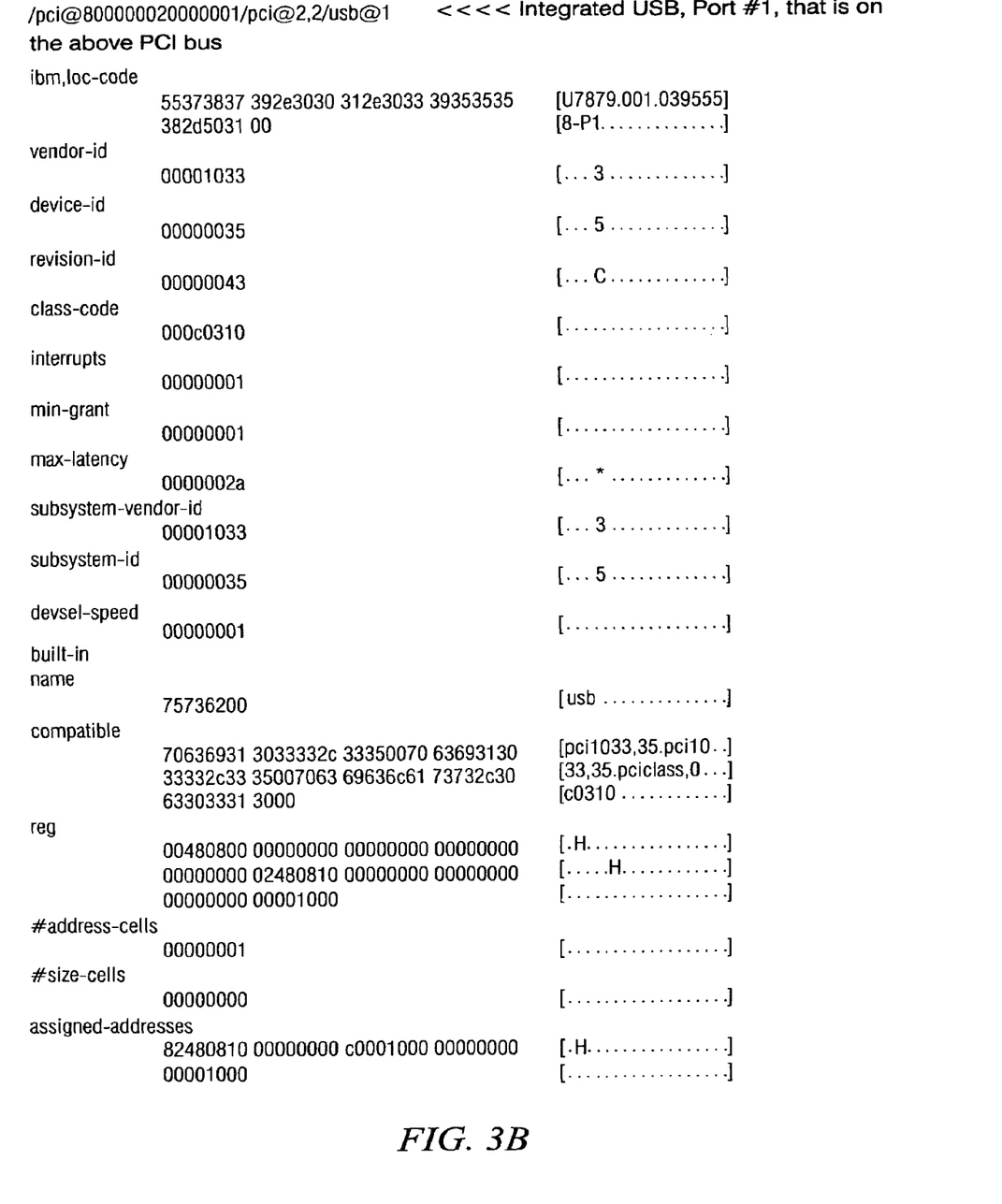
Figure 3C:
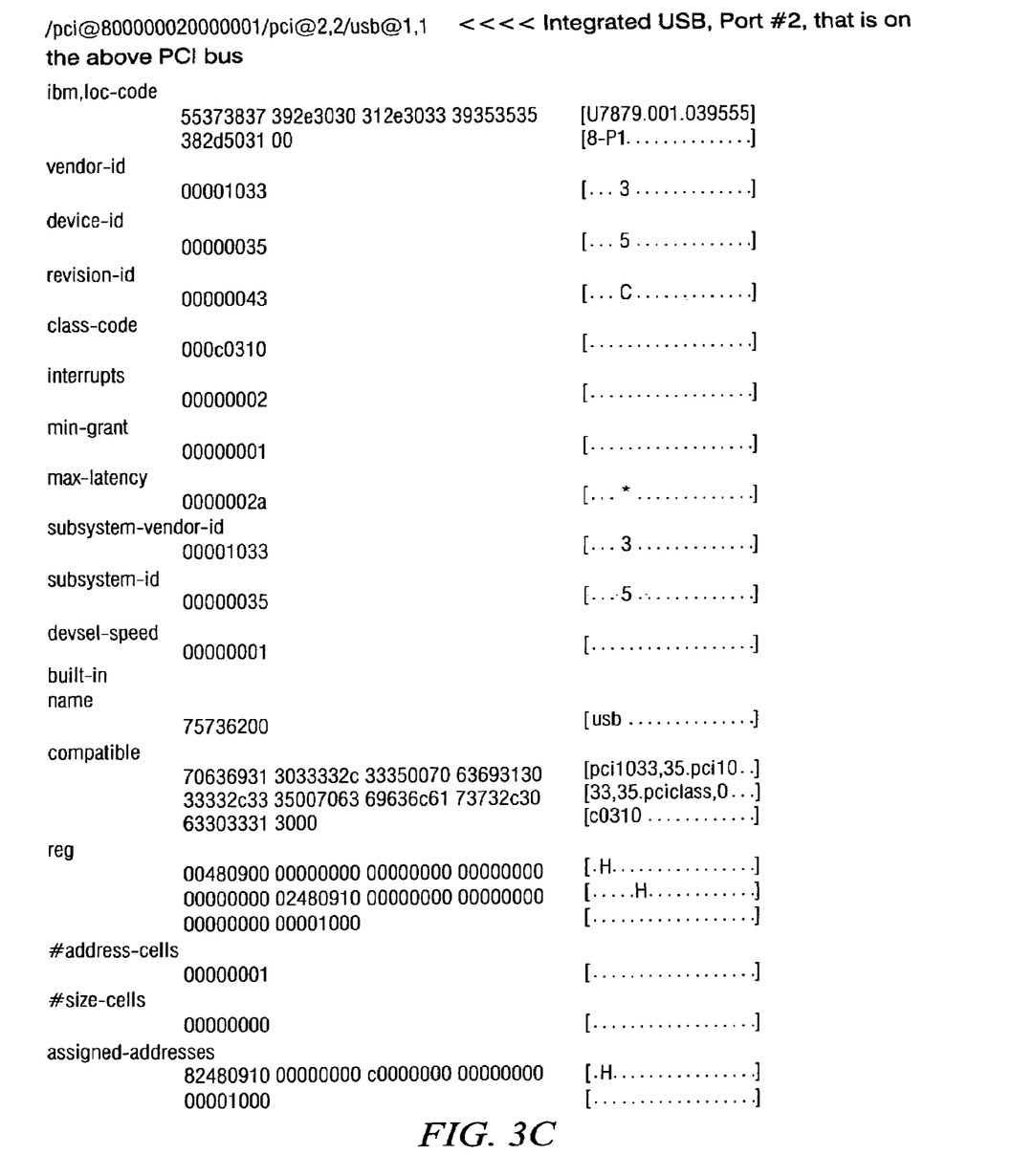

FIGS. 3A-3C are exemplary diagrams of a portion of a device tree for a PCI bus and its child devices in accordance with a known configuration mechanism. As shown in the depicted device tree, the "dma-window" property is directly under the PCI bus node /pci@800000020000001/pci@2,2. Information contained in the "dma-window" property is used by the PCI bus device driver to initialize DMA hardware, such as the physical to DMA address translation tables, when the bus is configured. The translation table pertaining only to that device is initialized. The "dma-window" information is also used to allocate and initialize internal data structures used by the DMA related kernel services, which the bus driver implements.

The PCI buses are configured before the child devices under them at partition initialization time. In the depicted device tree, two integrated Universal Serial Bus (USB) devices are provided on the PCI bus. It should be noted that the "dma-window" property belongs to the PCI bus, not the child devices under the PCI bus. In the depicted example, the child devices, i.e. the two USB devices, would share the same "dma-window" property of the PCI bus.

The "dma-window" property can be viewed as a flat address space on the input/output side. Just like processes in modern operating systems have a virtual address space and a physical address space, where the virtual memory manager (VMM) subsystem of the operating system translates virtual addresses to real addresses, and vice versa, there is a physical address space and an I/O address space (also known as a bus address space). DMA kernel services perform the translation from the physical address to an I/O or bus address.

The DMA hardware is programmed by the firmware to understand theses address spaces so that it can do the reverse translation, i.e. from bus address to physical address. The firmware reports address space information to the DMA kernel services, which are implemented as part of the PCI bus driver, via the "dma-window" property.

The "dma-window" has three parts to it: a logical bus identifier, a starting address, and a size of the window. In the depicted example, these parts are: 0x00000001, 0x02000000, and 0x10000000, respectively. Thus, the entire DMA bus address space for /pci@800000020000001/pci@2,2 bus is 256 MB in size starting with bus address 0x02000000. The 256 MB space is shared by the two USB devices to perform their DMA operations. Each address from 0x02000000 to 0x02000000+0x10000000−1 translates to some address in the physical memory depending on how the DMA kernel service translates the address.

The primary observation to be obtained from the examples shown in FIGS. 3A-3C is that the "dma-window" property belongs to the PCI bus node in the device tree and that the PCI bus node is configured before the USB devices. This causes the DMA hardware to be "ready-to-go"before the USB device driver can ever initiate the first DMA operation. However, with virtual input/output (VIO), since the address space for DMA operations is allocated to the child virtual devices themselves, and is not owned by the VIO bus, the DMA hardware and operating system resources are not configured for DMA operations prior to the first DMA operation from a child virtual device. That is, rather than the child virtual devices sharing a "dma-window" that is owned by the VIO bus, the child virtual devices may each be provided with up to a full 4 GB of bus address space of their own represented by a "dma-window" property in the child virtual device's node in the device tree.

The VIO bus device driver does not know about the "dma-window" of each child virtual device when the VIO bus is configured. Obviously, a child virtual device cannot perform a DMA operation until the DMA setup is completed by the VIO bus device driver so that the DMA hardware and operating system resources, e.g., address translation tables, etc., are configured for use by the child virtual device. The present invention addresses this problem and provides a mechanism for passing address space information between device drivers for the child virtual devices and for the VIO bus to which they are "attached," to permit the DMA hardware to be "ready-to-go" when the first DMA operation is initiated by a child virtual device.

Figure 4:
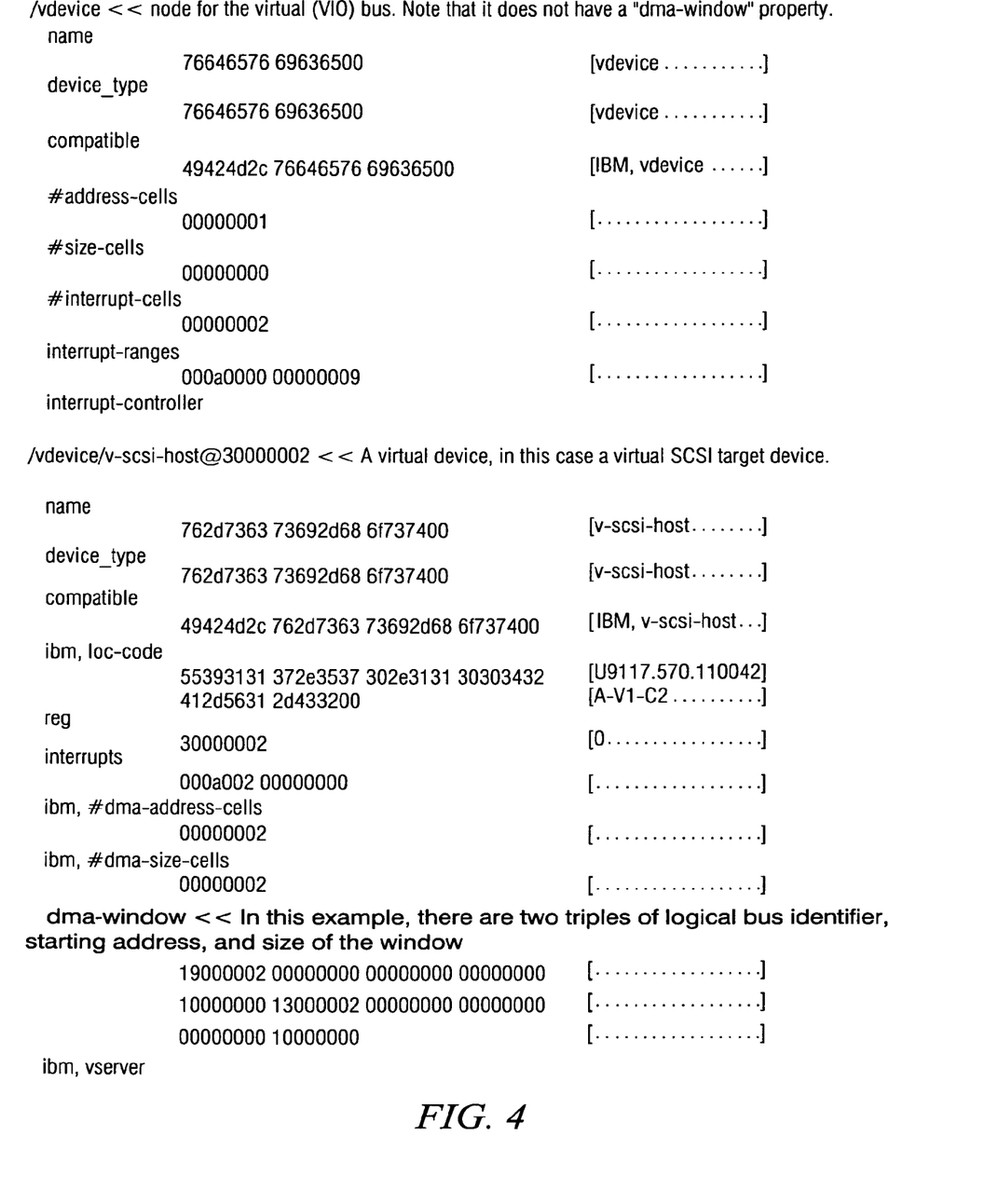
FIG. 4 is an exemplary diagram of a portion of a device tree for a VIO bus and its child devices in accordance with one exemplary embodiment of the present invention.

FIG. 4 is an exemplary diagram of a portion of a device tree for a VIO bus and its child virtual devices in accordance with one exemplary embodiment of the present invention. In the example of the portion of a device tree shown in FIG. 4, in the device tree nodes for the VIO bus, i.e./vdevice node, and child virtual device, i.e./vdevice/v-scsi-host@30000002, the "dma-window" property belongs to the virtual device node. This depicted virtual device has two windows, each with a logical bus identifier, starting address, and size of the window. In this example, the dma-windows are 256 MB in size starting with DMAble address of 0. Also note that the starting address and size are 64-bit quantities, whereas the logical bus identifier is a 32-bit quantity. This size of the starting address, size of the window quantity, and logical bus identifier is operating system and architecture specific. In this specific example of the virtual SCSI target device, information about both windows would be passed to the VIO bus driver, however, only the first dma-window information is actually used to initialize the DMA hardware and internal data structures.

Figure 5:
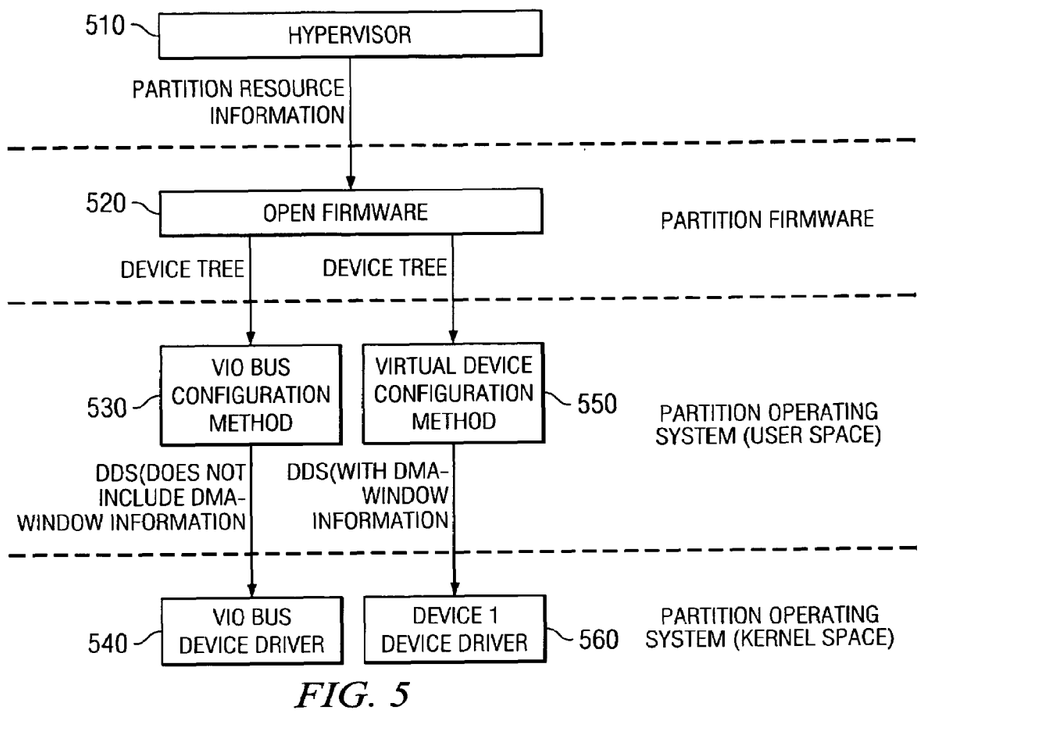
FIG. 5 is an exemplary diagram illustrating a DMA configuration operation for a VIO bus in accordance with one exemplary embodiment of the present invention.

FIG. 5 is an exemplary diagram illustrating a DMA configuration operation for a VIO bus in accordance with one exemplary embodiment of the present invention. As shown in FIG. 5, the configuration operation is similar to that of FIG. 2 with the exception that the device dependent structure (DDS) provided by the virtual input/output (VIO) bus' configuration method 530 to the VIO bus device driver 540 does not include the dma-window properties for the VIO bus or each child virtual device. Thus, the VIO bus device driver is not capable of allocating portions of the dma-window to the child virtual devices and does not have any information regarding the dma-windows for each child virtual device.

To the contrary, the dma-window information for the child virtual devices is present in the child virtual device nodes within the device tree generated by the open firmware 520. As a result, when the child virtual device's configuration method 550 is called, the child virtual device's configuration method 550 may obtain the necessary dma-window information for that child virtual device from the open firmware device tree, generate a DDS with this information present and provide this DDS to the child virtual device's device driver 560. However, the DMA hardware and operating system resources associated with the VIO bus cannot be configured for DMA operations from that child virtual device since the VIO bus device driver 540 does not have any information regarding the dma-window allocated to the child device.

Figure 6:
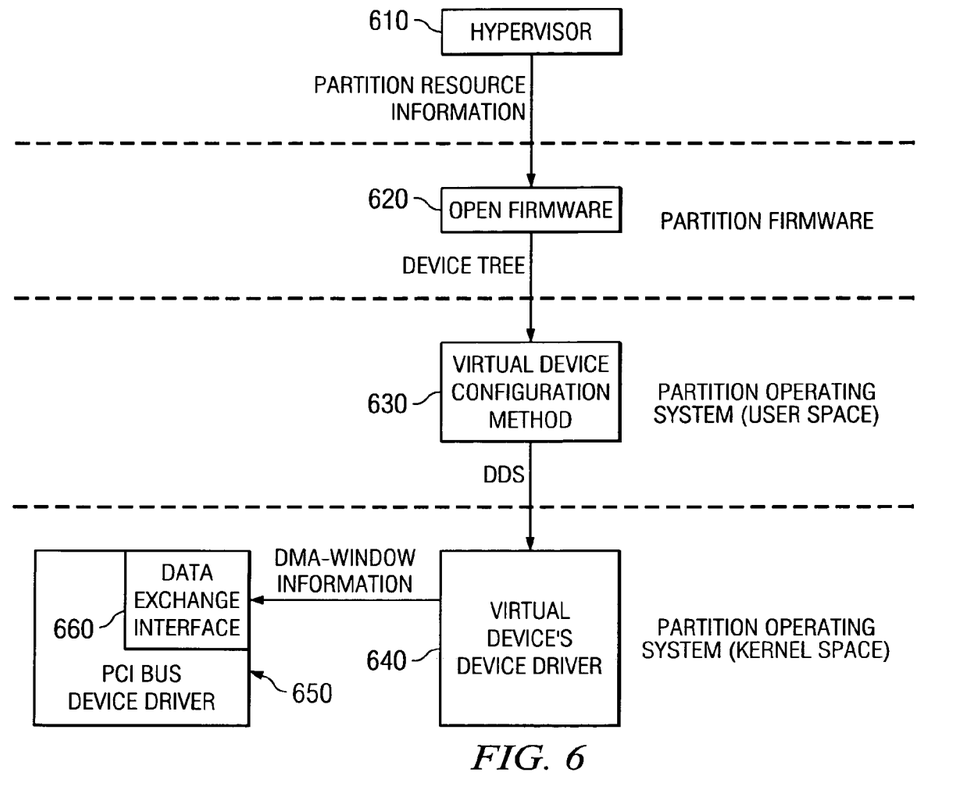
FIG. 6 is an exemplary diagram illustrating a configuration operation in accordance with one exemplary embodiment of the present invention.

FIG. 6 is an exemplary diagram illustrating a configuration operation in accordance with one exemplary embodiment of the present invention. In the depicted example, it is assumed that the VIO bus has already been configured in a manner similar to that discussed above with regard to FIG. 5. As shown in FIG. 6, the configuration operation is similar to that of FIG. 5 with regard to a child virtual device of a VIO bus being configured. That is, the child virtual device's configuration method 630 receives a device tree from the open firmware 620, which is generated based on partition resource-information obtained from the hypervisor 610, and generates a DDS describing the child virtual device. This DDS includes the dma-window information for the child virtual device. The DDS is provided to the child virtual device's device driver 640.

With the present invention, however, in order to configure the DMA hardware and operating system resources for DMA operations from the child virtual device, a mechanism is provided for passing the dma-window information directly to the VIO bus device driver 650 from the child virtual device driver 640 in the partition operating system kernel space. This mechanism is referred to in FIG. 6 as the data exchange interface 660. The data exchange interface 660 may be invoked by the child virtual device's device driver 640 with a parameter being passed that identifies the dma-window for the child virtual device. The data exchange interface 660 may then write this information to a data structure maintained by the virtual bus driver 650 and use this information to configure the DMA hardware and operating system resources. The child virtual device driver is now ready for use with DMA operations.

Figure 7:
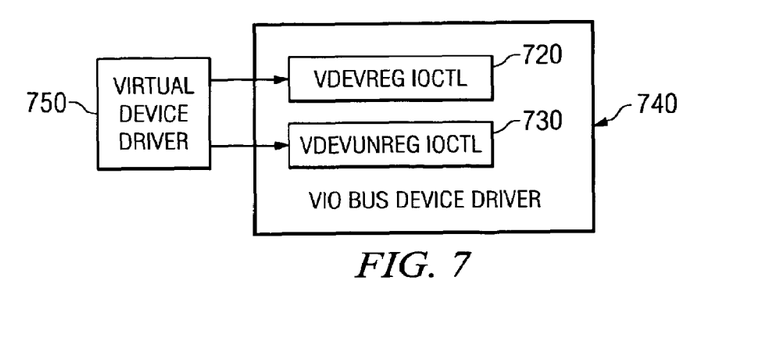
FIG. 7 is an exemplary diagram of one exemplary embodiment of a data exchange interface in accordance with the present invention.

FIG. 7 is an exemplary diagram of one exemplary embodiment of a data exchange interface in accordance with the present invention. As shown in FIG. 7, in one exemplary embodiment of the present invention, the data exchange interface includes a first input/output control (IOCTL) method 720 called virtual device register (VDEVREG) for registering child virtual devices with the virtual input/output (VIO) bus device driver 740. In addition, a second IOCTL method 730 called virtual device unregister (VDEVUNREG) is provided for unregistering child virtual devices from the VIO bus device driver 740.

These IOCTL methods 720 and 730 may be called by the child virtual device driver 750 to either register or unregister the child virtual device with the VIO bus device driver 740. In order to be able to call these IOCTL methods 720 and 730, the child virtual device driver 750 must know the device identifier of the VIO bus to which the child virtual device is "attached." This information may be provided from the child device's configuration method in the DDS based on information obtained from the device tree. Knowing the device identifier for the VIO bus, the child virtual device's device driver 750 may call the IOCTL methods 720 and 730 on that particular bus device's device driver in order to register/unregister the child virtual device with the VIO bus.

In calling these IOCTL methods 720 and 730, the child virtual device driver 750 passes, as a parameter, the dma-window information it obtained from the child virtual device's configuration method via the DDS generated by the configuration method. This dma-window information is then used by the IOCTL methods 720 and 730 to either initialize the appropriate DMA hardware and operating system resources for DMA operations with the child virtual device using the allocated dma-window (register) or to free these operating system resources and DMA hardware (unregister).

In order to perform these operations, for example, the fp_open( ) method is called by the virtual device driver to open the VIO bus driver using the device identifier (e.g., the major and minor numbers) of the VIO bus. If fp_open( ) succeeds, the virtual device driver then calls fp_ioctl( ); to register or unregister with the VIO bus driver.

The IOCTL for registration takes the "dma-window" information and initializes the physical to DMA address translation table for that device. For example, it initializes the permission bits in the table entries to "no access." This table is read by the Peripheral Host Bridge (PHB) hardware to perform the actual DMA operation. In addition to the translation table, the VIO bus driver allocates and initializes internal data structures based on the "dma-window" information which are to be used by the DMA related kernel services that the VIO bus driver implements. The registration interface also saves the "dma-window" information in the VIO bus driver's memory, so that it can effectively read from and write to the translation table entries as the DMA requests arrive from the virtual device driver. The DMA kernel services like d_map_page( ) and d_map_list( ) write out the translation information when the virtual device driver calls them. These services ensure that mapping is performed only within the dma-window, i.e. the address range specified by the dma-window, of that particular driver. Similarly, the d_unmap_page( ) and d_unmap_list( ) services invalidate the translation table entries but only within a given dma-window.

The unregistration interface frees any internal data structures allocated at the registration time. It does so only after verifying that no DMA operations are in flight or pending. Thus, further DMA operations from the driver are neither expected nor allowed.

Registration and unregistration are typically one-time operations that are performed at configuration and unconfiguration time. Map and unmap operations may be performed many times between a registration and unregistration operation while the device is actively in use. Map and unmap operations are not permitted before the registration and after the unregistration is complete.

In an alternative embodiment, rather than having two new IOCTL methods 720 and 730, a single IOCTL method may be provided with a parameter that identifies whether that IOCTL should operate to register or unregister a child device with the VIO bus device driver. In such an embodiment, the child virtual device's device driver may call the IOCTL method and provide as parameters the dma-window information and a value for the input parameter identifying either registration or unregistration of the child virtual device from the VIO bus device driver. The IOCTL will include functionality that encompasses both the registration and unregistration operations with one or the other being selected based on the setting of the input parameter.

The IOCTL method embodiment of the present invention provides a "clean" approach to solving the problem of passing information between device drivers in the kernel space that is easily implemented. However, these IOCTL methods must be provided in the VIO bus device driver. Thus, each VIO bus device driver that will need to obtain information from child virtual devices must implement these IOCTL methods in order to be able to obtain the necessary information from the child virtual devices.

There are two main difficulties in using the IOCTL interface. First, the device driver that is passing the information needs to know the device identifier of the target device driver. This is not necessarily a straightforward task because it requires access to the device configuration information of the destination device, i.e. the device driver to which the information is being passed. A source device driver, i.e. the device driver passing the information, might not have access to this information from the kernel space and thus, its configuration method may need to access the information and pass it down as part of the DDS. This special step may require changes to the configuration method of the source device.

Second, the operating system needs to provide open( ), close( ), and icotl( ) interfaces in the kernel space as well. These are file system interfaces that are typically used for the kernel space operation from the user space. In other words, a user space application may call an IOCTL of a kernel extension or device driver to accomplish some special task. Before calling an ioctl( ), the user space application opens the kernel extension with its name. For example, open("/dev/hdisk0", O_RDONLY)(the name of the device, which is more natural and convenient, is replaced with the device identifier in the kernel space as mentioned above because names like "/dev/hdisk0" have no-direct meaning in the kernel space). The AIX operating system provides these interfaces as fp_open( ), fp_ioctl( ), and fp_close( ). However, other operating systems may not provide such interfaces in the kernel space.

Figure 8:
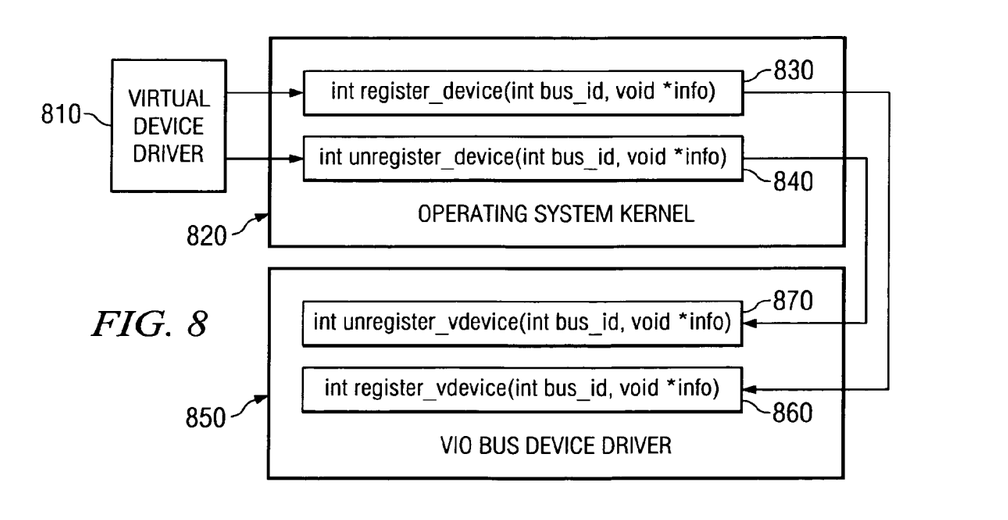
FIG. 8 is an exemplary diagram of another exemplary embodiment of a data exchange interface in accordance with the present invention.

FIG. 8 is an exemplary diagram of another exemplary embodiment of a data exchange interface in accordance with the present invention. The data exchange interface shown in FIG. 8 is provided as an alternative embodiment in which the problems associated with providing new IOCTL methods are avoided. As shown in FIG. 8, rather than providing two new IOCTL methods, in this alternative embodiment the operating system kernel 820 exports two new kernel services 830-840, or optionally a single kernel service with an operation parameter similar to that discussed above with regard to the single IOCTL method, that can be called by the child virtual device's device driver 810. The operating system kernel calls a bus specific registration/unregistration routine 860-870. The operating system kernel 820 keys off of the bus_id to find the right bus specific routine and calls it with a function pointer. The bus_id is a way to identify which bus driver's registration or unregistration service needs to be called. For example, the system may support multiple types of buses such as ISA, PCI, VIO, and so on. Each bus has its own bus driver and may implement the registration and unregistration services. The kernel services identify which bus driver based on the bus_id. The bus_id is also used by other kernel services as well, such as d_map init( ), and hence, bus_id is already available to the device driver. Although the present invention is described in terms of use with the VIO bus driver, the present invention may be used with any type of bus including ISA, PCI, and the like.

Once the bus driver is identified, the kernel service needs to call the function in the bus driver. In a preferred embodiment, this is accomplished with a standard C interface for calling functions via function pointers. The function pointers are convenient because the kernel needs to save off just two function pointers per bus driver at boot time. The bus drivers, during their configuration as shown in FIG. 2, pass the function pointers to the kernel via a kernel service. For example, in the AIX operating system, the bus_register( ) kernel service, which is used by the bus drivers to register a variety of information with the kernel, can be used to pass these function pointers to the kernel. Since the bus drivers are configured before their child devices, the function pointers are already setup by the time that the child devices are configured.

The bus specific routine 860-870 performs registration or unregistration of a virtual child device with the VIO bus. In the present exemplary embodiment, the VIO bus driver's registration/unregistration functions perform the task of initializing the physical to DMA address translation tables as well as internal data structures to be used by the VIO DMA kernel services. The kernel services, on the other hand, are simply a pass-through interface which is exported for any device driver or kernel extension to call. As described above, the kernel services simply call the appropriate bus driver's registration/unregistration functions using the function pointers. The kernel services are not concerned about the nature of the information or how it will be used and do not perform any validation on the information. All of the validation is done by the bus driver specific routines that are called by the kernel services via the function pointers. Success and failure return codes can also be pass-through, i.e. if the bus driver specific routine fails for some reason, the kernel service can pass the failure upwards to the calling device driver.

The kernel services are exported to the global kernel name space. In the present embodiment, they are called register_device( ) and unregister_device( ). Exporting these kernel services to the global kernel name space makes them available to all kernel extension and device drivers. Contrary to this, the bus driver specific routines are internal to the drivers and are only available to any object bound to the driver. In other words, they are only visible within the name space of the driver and do not have a global visibility like the kernel services. Therefore, they are not directly callable by other device drivers and kernel extensions.

Figure 9:
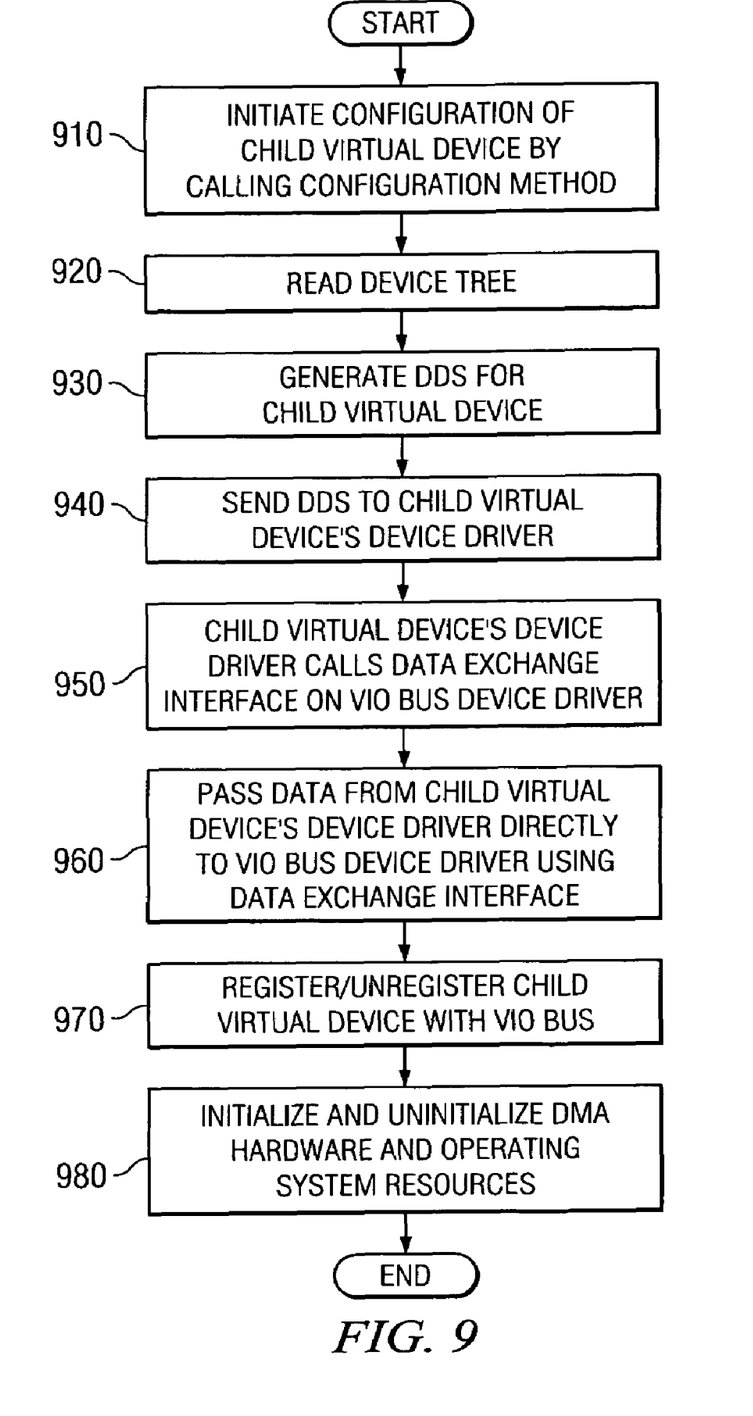
FIG. 9 is a flowchart outlining an exemplary operation of the present invention when configuring a VIO bus and its child devices for DMA operations.

FIG. 9 is a flowchart outlining an exemplary operation of the present invention when configuring a VIO bus and its child devices for DMA operations. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

As shown in FIG. 9, the operation starts by initiating a configuration of a child virtual device by calling a configuration method associated with the child virtual device (step 910). It is assumed for purposes of the present description that the VIO bus has already been configured. The configuration method for the child virtual device reads the device tree generated by the firmware (step 920) and generates a device dependent structure (DDS) for the child virtual device (step 930). This DDS includes an identifier of the VIO bus to which the child virtual device is attached and the dma-window associated with the child virtual device. The DDS is sent to the child virtual device's device driver (step 940).

The child virtual device's device driver then calls a data exchange interface of either a VIO bus device driver or an operating system kernel, depending on the particular embodiment above (step 950). Data is passed from the child virtual device's device driver to the data exchange interface of the operating system kernel/VIO bus device driver (step 960). This data may indicate, for example, the dma-window for the child virtual device.

The data exchange interface registers/unregisters the child virtual device with the VIO bus (step 970) and initializes the DMA hardware and operating system resources for DMA operations with the child virtual device (step 980). The operation then terminates.

Thus, the present invention provides a mechanism by which dma-window information may be passed directly from a child virtual device's device driver to a VIO bus device driver in order to register/unregister the child virtual device with the VIO bus for DMA operations. While the above embodiments have been described in terms of configuring a system for DMA operations with a child virtual device, the present invention is not limited to such. Rather, the mechanisms of the present invention may be used to pass any suitable information between device drivers in an operating system kernel space. Thus, rather than only using this invention for configuring child virtual devices for DMA operations with a VIO bus, the present invention may also be used, for example, to pass any device specific information that needs to be shared with another kernel extension or driver.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method, in a data processing system for directly passing data between a first device driver and a second device driver, comprising:

identifying, in the first device driver, data to be provided to the second device driver;

invoking, by the first device driver, a data exchange interface within a kernel space, wherein the data exchange interface initializes a physical to Direct Memory Access (DMA) address translation table for the first device driver based on an identifier of a direct memory access window; and providing the data to the data exchange interface, wherein the data exchange interface, in the kernel space, writes the data to a data structure maintained and used by the second device drivers, wherein the first device driver is associated with a child device in a device tree and the second device driver is associated with a parent device of the child device in the device tree, wherein the data to be provided to the second device driver includes the identifier of the direct memory access window associated with the child device, wherein the identifier of the direct memory access window is obtained from a device dependent structure generated by a configuration method associated with the child device, and wherein the identifier of the direct memory access window is maintained in a memory associated with the parent device for use in writing and reading from the physical to the DMA address translation table entries as direct memory access requests arrive from the first device driver.

2. The method of claim 1, wherein the child device is a child virtual device and the parent device is a virtual input/output bus.

3. The method of claim 1, further comprising:

obtaining a device identifier of the parent device, wherein invoking the data exchange interface within the kernel space includes calling one of an input/output control method and a kernel service of the data exchange interface using the device identifier.

4. The method of claim 1, wherein the device identifier for the parent device is obtained from a device dependent structure generated by a configuration method associated with the child device.

5. The method of claim 1, wherein the data exchange interface includes at least one input/output control method for registering and unregistering child devices with a parent device in a device tree.

6. The method of claim 1, wherein the data exchange interface includes one or more kernel services for registering and unregistering child devices with a parent device in a device tree.

7. A recordable-type medium having a computer program product for directly passing data between a first device driver and a second device driver, the computer program product comprising:

first instructions for identifying, in the first device driver, data to be provided to the second device driver;

second instructions for invoking, by the first device driver, a data exchange interface within a kernel space, wherein the data exchange interface initializes a physical to Direct Memory Access (DMA) address translation table for the first device driver based on an identifier of a direct memory access window; and third instructions for providing the data to the data exchange interface, wherein the data exchange interface, in the kernel space, writes the data to a data structure maintained and used by the second device driver;

wherein the first device driver is associated with a child device in a device tree and the second device driver is associated with a parent device of the child device in the device tree, wherein the data to be provided to the second device driver includes the identifier of the direct memory access window associated with the child device, wherein the identifier of the direct memory access window is obtained from a device dependent structure generated by a configuration method associated with the child device, and wherein the identifier of the direct memory access window is maintained in a memory associated with the parent device for use in writing and reading from the physical to the DMA address translation table entries as direct memory access requests arrive from the first device driver.

8. The recordable-type medium of claim 7, wherein the child device is a child virtual device and the parent device is a virtual input/output bus.

9. The recordable-type medium of claim 7, wherein the computer program product further comprises: fourth instructions for obtaining a device identifier of the parent device, wherein the second instructions for invoking the data exchange interface within the kernel space include instructions for calling one of an input/output control method and a kernel service of the data exchange interface using the device identifier.

10. The recordable-type medium of claim 7, wherein the device identifier for the parent device is obtained from a device dependent structure generated by a configuration method associated with the child device.

11. The recordable-type medium of claim 7, wherein the data exchange interface includes at least one input/output control method for registering and unregistering child devices with a parent device in a device tree.

12. The recordable-type medium of claim 7, wherein the data exchange interface includes one or more kernel services for registering and unregistering child devices with a parent device in a device tree.

13. A system for directly passing data between a first device driver and a second device driver, comprising:

a processor;

a memory coupled to the processor;

means for identifying, in the first device driver, data to be provided to the second device driver;

means for invoking, by the first device driver, a data exchange interface within a kernel space, wherein the data exchange interface initializes a physical to Direct Memory Access (DMA) address translation table for the first device driver based on an identifier of a direct memory access window; and means for providing the data to the data exchange interface, wherein the data exchange interface, in the kernel space, writes the data to a data structure maintained and used by the second device driver;

wherein the first device driver is associated with a child device in a device tree and the second device driver is associated with a parent device of the child device in the device tree, wherein the data to be provided to the second device driver includes the identifier of the direct memory access window associated with the child device, wherein the identifier of the direct memory access window is obtained from a device dependent structure generated by a configuration method associated with the child device, and wherein the identifier of the direct memory access window is maintained in a memory associated with the parent device for use in writing and reading from the physical to the DMA address translation table entries as direct memory access requests arrive from the first device driver.

* * * * *